(12) United States Patent
Shimizu et al.

(10) Patent No.: US 8,233,706 B2
(45) Date of Patent: Jul. 31, 2012

(54) IMAGE PROCESSING APPARATUS AND IMAGE PROCESSING METHOD

(75) Inventors: Masayoshi Shimizu, Kawasaki (JP); Yuushi Toyoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 192 days.

(21) Appl. No.: 12/850,188

(22) Filed: Aug. 4, 2010

(65) Prior Publication Data
US 2010/0322509 A1 Dec. 23, 2010

Related U.S. Application Data

(63) Continuation of application No. PCT/JP2008/052439, filed on Feb. 14, 2008.

(51) Int. Cl.
*G06K 9/36* (2006.01)
(52) U.S. Cl. ........................ 382/162; 382/274
(58) Field of Classification Search .......... 382/162, 382/274–275, 254, 284, 260–266; 348/625, 348/627.254; 358/3.26–3.27, 521
See application file for complete search history.

(56) References Cited

U.S. PATENT DOCUMENTS

| | | | |
|---|---|---|---|
| 5,760,922 A | 6/1998 | Kojima | |
| 7,558,435 B2 * | 7/2009 | Okada et al. | 382/266 |
| 7,791,656 B2 * | 9/2010 | Katagiri et al. | 348/254 |
| 7,916,967 B2 * | 3/2011 | Takita et al. | 382/274 |
| 2004/0246378 A1 | 12/2004 | Okada et al. | |

FOREIGN PATENT DOCUMENTS

| | | |
|---|---|---|
| JP | 07-170395 | 7/1995 |
| JP | 2000-105815 | 4/2000 |
| JP | 2003-085578 | 3/2003 |
| JP | 2004-289607 | 10/2004 |

OTHER PUBLICATIONS

International Search Report issued May 13, 2008, in Int'l. Application No. PCT/JP2008/052439.

* cited by examiner

*Primary Examiner* — Ishrat I Sherali
(74) *Attorney, Agent, or Firm* — Greer, Burns & Crain, Ltd.

(57) ABSTRACT

An image processing apparatus performs a gradation conversion on an input image (frame) input from the outside to generate a conversion image and performs a plurality of smoothing processes corresponding to a plurality of preset level values on the generated conversion image or a reduced image generated from the conversion image to generate a plurality of level-value-limited conversion images. Then, the image processing apparatus selects one or a plurality of conversion images from the plurality of level-value-limited conversion images, synthesizes the selected images, generates a synthesis image, performs the gradation conversion on the generated synthesis image, and generates a smoothed image that is converted to have the same gradation as that of the input image.

19 Claims, 15 Drawing Sheets

IMAGE PROCESSING APPARATUS AND IMAGE PROCESSING METHOD

CROSS-REFERENCE TO RELATED APPLICATION(S)

This application is a continuation of International Application No. PCT/JP2008/052439, filed on Feb. 14, 2008, the entire contents of which are incorporated herein by reference.

FIELD

The embodiments discussed herein are directed to an image processing apparatus and an image processing method for smoothing an input image to generate a smoothed image.

BACKGROUND

When a smoothed image obtained by blurring an image is generated in digital image processing, there is conventionally used a technique for using the average value of the level (gradation) values of pixels within a filter size as the signal level of a target pixel by using a low-pass filter. However, when using a low-pass filter, an edge portion that has a large difference between level values also becomes dim because the average value of the level values of the pixels within a filter size is used as the signal level of a target pixel.

Specifically, as illustrated in FIG. 15, when using a low-pass filter, a gradient for an edge portion having a large brightness difference in a process target image that is indicated by the solid line gets dull in the case of a low-pass filter image (LPF image in the present drawing) output from the low-pass filter that is indicated by the dotted line, and thus it is impossible to hold the edge portion.

Consequently, various technologies for accurately saving an edge portion and blurring the other portions are disclosed. A technology related to a face image processing apparatus (image processing apparatus) that uses an epsilon filter ($\epsilon$ filter) has been known as disclosed in, for example, Japanese Laid-open Patent Publication No. 2000-105815.

Specifically, as illustrated in FIG. 16, the face image processing apparatus uses a pixel located at an image coordinate (m, n) as a target pixel and uses eight pixels (in this case, coordinate (m−1, n−1), coordinate (m, n−1), coordinate (m+1, n−1), coordinate (m−1, n), coordinate (m+1, n), coordinate (m−1, n+1), coordinate (m, n+1), and coordinate (m+1, n+1)) that are surrounding pixels of the target pixel as peripheral pixels, and then computes the difference between the level value (for example, the gradation value of a luminance signal) of the target pixel and the level value of each peripheral pixel. The face image processing apparatus extracts a peripheral pixel for which the computed difference is smaller than a predetermined threshold value, and then outputs a value obtained by adding a pixel value, which is obtained by multiplying the signal level of the extracted peripheral pixel by a predetermined coefficient, to the pixel value of the target pixel as a pixel value of the target pixel.

In this manner, with attention to each pixel of the input image, the level width of the gradation value can be limited by using only a peripheral pixel for which the difference with the level value of the noticed pixel (target pixel) is smaller than the threshold value as a target that is processed by a smoothing process. Therefore, as illustrated in FIG. 17, the gradient of the edge portion of an epsilon filter image output from an epsilon filter that is indicated by the dotted line does not get dull and the edge portion of a process target image indicated by the solid line is accurately saved. As a result, the other portions except for the edge portion can be blurred.

However, because the above conventional art has a large processing load, there is a problem in that a process cannot be speeded up. Specifically, a conditional branch process for using each pixel of an input image as a target pixel, extracting a difference between the level value of each target pixel and the level value of the peripheral image of each target image, and determining whether the difference is smaller than a threshold value is performed. As a result, a process cannot be speeded up because a processing load is large.

SUMMARY

According to an aspect of an embodiment of the invention, an image processing apparatus includes a first converting unit that performs a gradation conversion on an input image to generate a conversion image; a smoothed image generating unit that performs a smoothing process on the conversion image generated by the first converting unit or a first generation image generated from the conversion image to generate a plurality of level-value-limited conversion images, the smoothing process smoothing pixels within different ranges of level values with a filter having a same filter size; a synthesis processing unit that selects at least one of the level-value-limited conversion images generated by the smoothed image generating unit and synthesizes the at least one of the level-value-limited conversion images to generate a synthesis image; and a second converting unit that performs a gradation conversion on the synthesis image generated by the synthesis processing unit to generate a smoothed image that is converted to have a same gradation as that of the input image.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Figure 1:
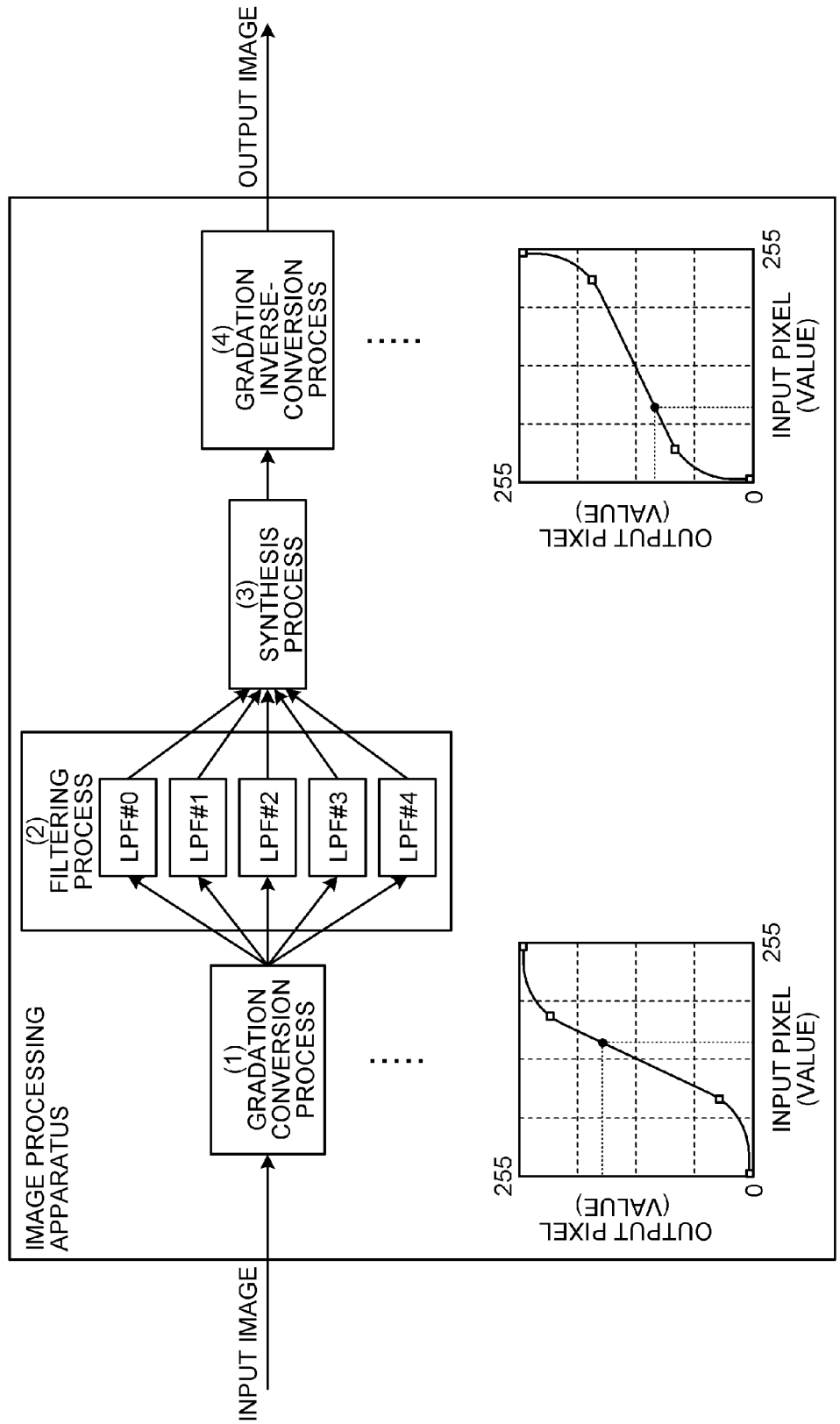
FIG. 1 is a system configuration diagram illustrating the entire configuration of an image processing apparatus according to a first embodiment.

Preferred embodiments of the present invention will be explained with reference to accompanying drawings. The present invention is not limited to the embodiments explained below. Hereinafter, it will be sequentially explained about the main terms that are used in the present embodiment, the brief and special feature of an image processing apparatus according to the present embodiment, and the configuration and process flow of the image processing apparatus. Finally, it will be explained about various alternative examples for the present embodiment.

[a] First Embodiment

Explanation of Term

First, it will be explained about the main terms that are used in the present embodiment. An "image processing apparatus" that is used in the present embodiment is an apparatus that generates a smoothed image obtained by blurring the other portions other than an edge portion while accurately saving the edge portion from the input image (frame) by using a process having an effect close to an epsilon filter ($\epsilon$ filter) that is an effective technique for removing the noise of a digital image without distinction of a moving image and a still image. The image processing apparatus then outputs, for example, the generated smoothed image to a dynamic range device that performs a dynamic range compression for cleaning a backlight image or the like to generate an image. Then, the dynamic range device computes a low frequency component and a high frequency component of an input image that is a process target image from the input image or the smoothed image, performs a dynamic range compression by using the computed low frequency component and high frequency component, and generates (reproduces) the input image that is obtained by removing noises. In this case, a low frequency component is the level value of the pixel of an input image or a smoothed image and a high frequency component is a difference between the level value of the pixel of an input image and the level value of the pixel of a smoothed image that is located at a position corresponding to the pixel of the input image.

Noises inside an image include noise by a brightness change and noise by a color change. Noise by a color change has a tendency that a change difference is small and a granularity is large. Because it is necessary that an epsilon filter that is generally used increases the number of peripheral pixels that are used for smoothing to remove noise having a large granularity, a computational amount increases and thus a process cannot be speeded up.

Therefore, the "image processing apparatus" that is used in the present embodiment digitalizes a noise rejection process by level values and fixes digitalized individual filtering processes by fixed parameters to speed up by using a digitizing epsilon filter that divides (digitize) and processes an input image into a plurality of planes (level values) on the basis of each pixel value. Specifically, the "image processing apparatus" performs the plurality of digitalized individual filtering processes on the input image to generate a plurality of filtering results and interpolates and merges the plurality of generated filtering results to perform a process that obtains an effect close to the epsilon filter at high speed.

In recent years, along with the high image quality of an image, noise having small amplitude stands out even if the above image processing is performed. Moreover, along with the popularization of a network, a real-time process is requested and a high-speed process is also requested even in the above image processing. However, when using a digitizing epsilon filter, it is necessary to increase the number of planes to be digitalized in order to remove noise having small amplitude that is a small color difference, and thus an effect of high speed obtained by digitizing the process has faded. In other words, because a level difference between filters should be reduced to remove noise having small amplitude (because the level width of the digitalized filter should be reduced), the number of filters to be processed increases and thus a computational amount increases. Therefore, when removing noise that has large granularity and small amplitude, an image processing apparatus of which the computational amount is small and the processing speed is high is earnestly desired.

Brief and Special Feature of Image Processing Apparatus

Next, it will be explained about the brief and special feature of an image processing apparatus according to the first embodiment with reference to FIG. 1. FIG. 1 is a system configuration diagram illustrating the entire configuration of the image processing apparatus according to the first embodiment.

As illustrated in FIG. 1, the image processing apparatus includes digitizing epsilon filters (LPF #0 to LPF #4). The image processing apparatus performs a filtering process on an input image by using the filters, generates a plurality of filtering results, interpolates and merges the plurality of generated filtering results to generate a smoothed image. The digitizing epsilon filters (LPF #0 to LPF #4) are one-dimensional low pass filters that have the same filter size and respectively have different level value (gradation value) ranges that are previously set. The digitizing epsilon filters perform a smoothing process on pixels within the level value ranges that are respectively set in the input image as processing targets, and generate level-value-limited smoothed images. For example, in the present embodiment, 0 to 50 are set in LPF #0, 51 to 100 are set in LPF #1, 101 to 150 is set in LPF #2, 151 to 200 is set in LPF #3, and 201 to 255 are set in LPF #4 as level values.

In such a configuration, as described above, it is summarized that the image processing apparatus smoothes an input image to generate a smoothed image. In particular, the main characteristic is that a processing load is reduced and thus a process can be speeded up.

As a specific example of the main characteristic, when an image to be processed that is one frame of moving image data is input, the image processing apparatus converts the gradation of the input image to generate a conversion image (see (1) of FIG. 1). As a specific example, the image processing apparatus stores a gradation correction curve for performing a gradation conversion that changes the shading of the image, performs the gradation conversion to generate a conversion image on the basis of the gradation correction curve that stores the received input image, and outputs the generated conversion image to the filters (LPF #0 to LPF #4). In this way, a process level density (an absolute number processed by a filter corresponding to a medium value) adjacent to a medium value (adjacent to achromatic color) of level values (gradation values) can be raised by converting the gradation of an input image.

The image processing apparatus performs a plurality of smoothing processes corresponding to a plurality of preset level values on the generated conversion image or a first generation image (for example, reduced image) generated from the conversion image, and generates a plurality of level-value-limited conversion images (see (2) of FIG. 1). When specifically explaining the above-described example, the image processing apparatus performs five smoothing processes corresponding to the preset five level values by using LPF #0 to LPF #4, and generates five level-value-limited conversion images (level-value-limited conversion image #0 to level-value-limited conversion image #4).

It will be explained about the smoothing processes that are respectively performed by LPF #0 to LPF #4. Each of the LPF #0 to LPF #4 refers to the pixels of the input image, acquires pixels within a level value range that is set thereon, and accumulates the level values of the acquired pixels to compute (smooth) an average value. Moreover, each of the LPF #0 to LPF #4 performs the above technique on each of the transverse direction and longitudinal direction of the input image, computes an average value of the values computed from each direction, and uses the computed average value as a smoothed result of the pixels of the input image.

Next, the image processing apparatus selects one or a plurality of conversion images from the plurality of level-value-limited conversion images generated by the filters and synthesizes the selected images to generate a synthesis image (see (3) of FIG. 1). When specifically explaining the above-described example, the image processing apparatus selects a level-value-limited conversion image corresponding to the level value of each pixel of the conversion image from the plurality of level-value-limited conversion images that is generated by the filters. Then, the image processing apparatus synthesizes the plurality of level-value-limited conversion images selected for the pixels of the input image to generate one synthesis image (frame).

After that, the image processing apparatus performs a gradation inverse conversion on the generated synthesis image and generates a smoothed image that is converted to have the same gradation as that of the input image (see (4) of FIG. 1). When specifically explaining the above-described example, the image processing apparatus previously stores a gradation correction curve that is obtained by a gradation conversion opposite to the gradation conversion that is performed on the input image with respect to the generated synthesis image and performs the gradation conversion on the basis of the gradation correction curve. As a result, the image processing apparatus generates a smoothed image that is converted to have the same gradation as that of the input image.

In this way, the image processing apparatus according to the first embodiment raises a process level density (an absolute number processed by a filter corresponding to a medium value) adjacent to a medium value (adjacent to achromatic color) of the level values (gradation values) on which a color difference component particularly having an effective result concentrates by using digitizing filters (LPF #0 to LPF #4), and thus can remove noises having a large granularity and a small amplitude without preparing a filter that has levels that are finely divided. As a result, as described above, a processing load is reduced and a process can be speeded up.

Configuration of Image Processing Apparatus

Figure 2:
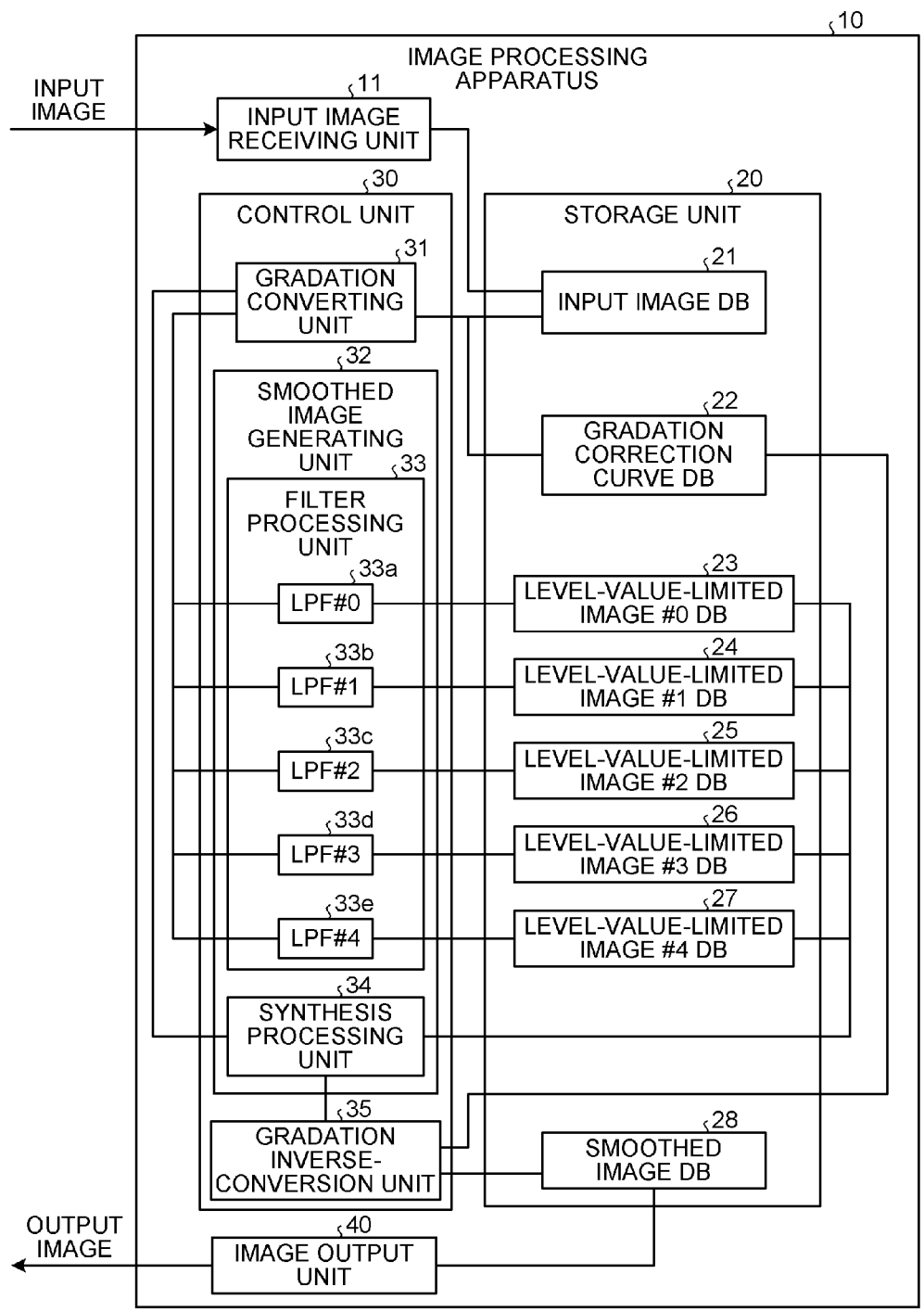
FIG. 2 is a block diagram illustrating the configuration of the image processing apparatus according to the first embodiment.

It will be explained about the configuration of an image processing apparatus illustrated in FIG. 1 with reference to FIG. 2. FIG. 2 is a block diagram illustrating the configuration of an image processing apparatus 10 according to the first embodiment. As illustrated in FIG. 2, the image processing apparatus 10 includes an input image receiving unit 11, a storage unit 20, a control unit 30, and an image output unit 40.

The input image receiving unit 11 receives moving image data and the like from the outside. Specifically, the input image receiving unit 11 receives moving image data by one frame from the outside and stores the received frame as an input image in an input image DB 21 to be described below.

The storage unit 20 stores data and programs required for various types of processes performed by the control unit 30. As units closely relevant to the present invention, the storage unit 20 includes the input image DB 21, a gradation correction curve DB 22, a level-value-limited image #0 DB 23, a level-value-limited image #1 DB 24, a level-value-limited image #2 DB 25, a level-value-limited image #3 DB 26, a level-value-limited image #4 DB 27, and a smoothed image DB 28.

The input image DB 21 stores therein frames to be input into the image processing apparatus 10. As a specific example, the input image DB 21 stores an N-th frame, an (N+1)th frame, and the like of moving image data that are stored by the input image receiving unit 11.

Figure 3:
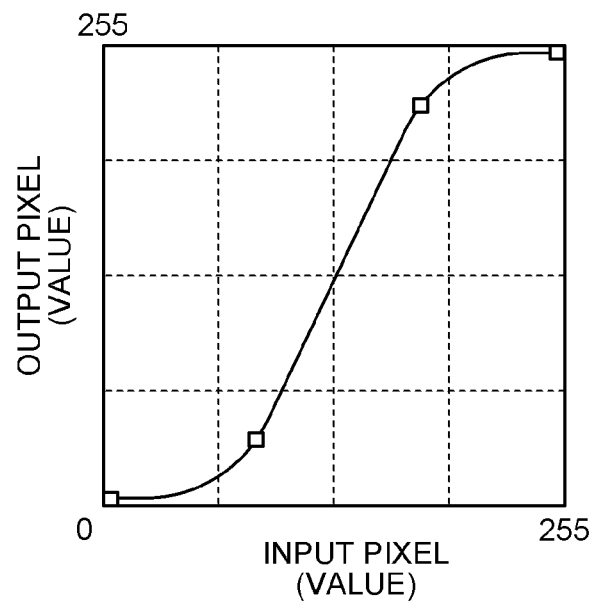
FIG. 3 is a diagram illustrating an example of information stored in a gradation correction curve DB.
Figure 4:
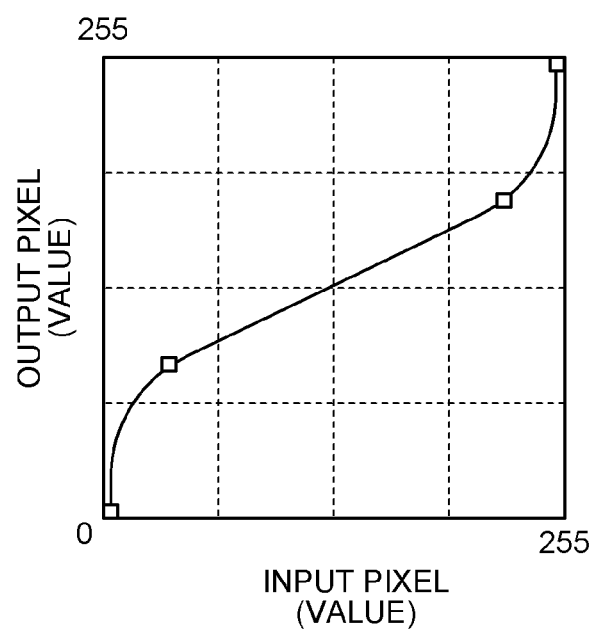
FIG. 4 is a diagram illustrating an example of information stored in the gradation correction curve DB.

The gradation correction curve DB 22 stores a gradation correction curve that is used for gradation conversion. As a specific example, as illustrated in FIG. 3, the gradation correction curve DB 22 stores a gradation correction curve that is used by a gradation converting unit 31 to be described below and uniquely associates an output pixel with an input pixel so that a process level density (an absolute number processed by a filter corresponding to a medium value) adjacent to a medium value (adjacent to achromatic color) of the level values (gradation values) on which a color difference component particularly having an effective result concentrates is raised by using the digitizing filters (LPF #0 to LPF #4), and further stores a gradation correction curve for performing inverse gradation conversion on the gradation correction curve of FIG. 4 that is used by a gradation inverse-conversion unit 35 to be described below. FIGS. 3 and 4 are diagrams illustrating an example of information stored in the gradation correction curve DB.

The level-value-limited image #0 DB 23 to the level-value-limited image #4 DB 27 store level-value-limited smoothed images that are generated by LPF #0 to LPF #4 of a filter processing unit 33 to be described below. As a specific example, the level-value-limited image #0 DB 23 stores a plurality of smoothed images of level values "0 pixels to 50 pixels" that are stored by the LPF #0. Similarly, the level-value-limited image #1 DB 24 stores a plurality of smoothed images of level values "51 pixels to 100 pixels" that are stored by the LPF #1, the level-value-limited image #2 DB 25 stores a plurality of smoothed images of level values "101 pixels to 150 pixels" that are stored by the LPF #2, the level-value-limited image #3 DB 26 stores a plurality of smoothed images of level values "151 pixels to 200 pixels" that are stored by the LPF #3, and the level-value-limited image #4 DB 27 stores a plurality of smoothed images of level values "201 pixels to 255 pixels" that are stored by the LPF #4.

The smoothed image DB 28 stores the generated smoothed image. As a specific example, the smoothed image DB 28 stores a smoothed image that is generated by the gradation inverse-conversion unit 35 to be described below, which is obtained by removing noise having a large granularity and a small amplitude from the input image and by blurring (smoothing) the other portions other than an edge portion while accurately saving the edge portion.

The control unit 30 includes an internal memory that stores a control program such as OS (Operating System), programs and required data that define various types of processing procedures. As units closely relevant to the present invention, the control unit 30 further includes the gradation converting unit 31, a smoothed image generating unit 32, and the gradation inverse-conversion unit 35, and executes various processes by using the units.

The gradation converting unit 31 performs a gradation conversion on the input image received by the input image receiving unit 11 and generates a conversion image. When specifically explaining the above-described example, the gradation converting unit 31 reads out the input image (one frame) that is received by the input image receiving unit 11 and stored in the input image DB 21 from the input image DB 21 and acquires a gradation correction curve that is stored in the gradation correction curve DB 22 and is used for the gradation conversion (see FIG. 3). Then, the gradation converting unit 31 converts the gradation of the input image read from the input image DB 21 to generate a conversion image on the basis of the acquired gradation correction curve, and outputs the conversion image to each of the filters (LPF #0 to LPF #4) of the smoothed image generating unit 32 and a synthesis processing unit 34 that are described below. Therefore, because the gradation converting unit 31 prepares a gradation correction curve that seems to concentrate near a medium value (achromatic color) of the level values (gradation values) in the gradation correction curve DB 22 and converts the gradation of the input image by using the gradation correction curve, a process level density can be raised with respect to the vicinity of a medium value (achromatic color) of the input image (the range of level values of an original image processed by a filter corresponding to the medium value can be reduced).

Figure 5:
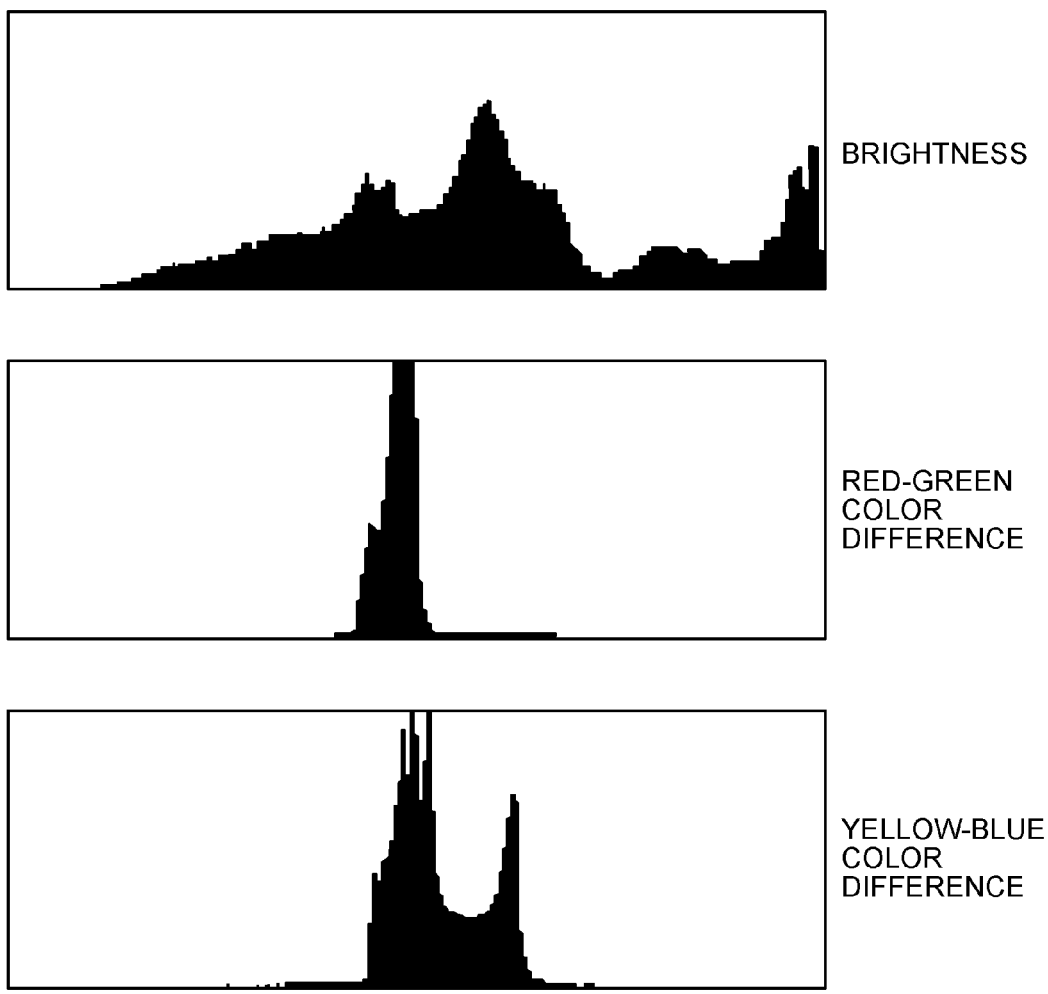
FIG. 5 is a diagram explaining a histogram of a color difference component.

More specifically, as illustrated in FIG. 5, when generating a histogram for each component in a certain image, "color difference components (red-green color difference and yellow-blue color difference)" have a narrow effective distribution as compared to "brightness". In other words, a color difference component concentrates on the vicinity of a medium value (achromatic color) of the level values (gradation values). Therefore, the gradation converting unit 31 prepares a gradation correction curve that seems to concentrate on the vicinity of the medium value (achromatic color) of the level values (gradation values) in the gradation correction curve DB 22 and converts the gradation of the input image by using the gradation correction curve, and thus a process level density (an absolute number processed by a filter corresponding to the medium value) adjacent to the medium value (achromatic color) of the input image can be raised. FIG. 5 is a diagram explaining a histogram of a color difference component.

The smoothed image generating unit 32 generates a smoothed image from an input image and includes the filter processing unit 33 and the synthesis processing unit 34 as units closely relevant to the present invention. Moreover, the filter processing unit 33 performs a filtering process on the input image by using filters of which the level value (gradation value) ranges are previously set to generate a plurality of filtering results, and includes LPF #0 to LPF #4 as units closely relevant to the present invention.

The LPF #0 to LPF #4 perform a plurality of smoothing processes corresponding to the plurality of preset level values (gradation values) on the generated conversion image or the first generation image (for example, reduced image) generated from the conversion image, and generates a plurality of level-value-limited conversion images. Specifically, the LPF #0 to LPF #4 refers to each pixel of the input image, acquires pixels within a level value range that is set thereon, and accumulates the level values of the acquired pixels to compute (smooth) an average value. Then, each of the LPF #0 to LPF #4 performs the above technique on each of the transverse direction and longitudinal direction of the input image, computes the average value of the values computed from each direction, and stores the computed average value as the smoothed result of the pixels of the input image in the level-value-limited image #0 DB 23 to the level-value-limited image #4 DB 27.

In this case, it is assumed that 0 to 50 are set in the LPF #0, 51 to 100 are set in the LPF #1, 101 to 150 are set in the LPF #2, 151 to 200 are set in the LPF #3, and 201 to 255 are set in the LPF #4 as level values. It will be explained about a process performed in LPF. For example, the LPF #0 refers to each pixel of the conversion image received from the gradation converting unit 31, acquires pixels of which the levels are 0 to 50, accumulates the level values of the acquired pixels, and computes an average value. Then, the LPF #0 performs the above technique on each of the transverse direction and longitudinal direction of the conversion image received from the gradation converting unit 31, computes the average value of the values computed from each direction, and stores the computed average value as the smoothed result of the pixels of the input image in the level-value-limited image #0 DB 23. In other words, the LPF #0 generates a smoothed image that is obtained by smoothing the conversion image received from the gradation converting unit 31 by using the level values "0 to 50".

Similarly, the LPF #1 generates a smoothed image that is obtained by smoothing the conversion image received from the gradation converting unit 31 by using the level values "51 to 100" and stores the smoothed image in the level-value-limited image #1 DB 24. The LPF #2 generates a smoothed image that is obtained by smoothing the conversion image received from the gradation converting unit 31 by using the level values "101 to 150" and stores the smoothed image in the level-value-limited image #2 DB 25. The LPF #3 generates a smoothed image that is obtained by smoothing the conversion image received from the gradation converting unit 31 by using the level values "151 to 200" and stores the smoothed image in the level-value-limited image #3 DB 26. The LPF #4 generates a smoothed image that is obtained by smoothing the conversion image received from the gradation converting unit 31 by using the level values "201 to 255" and stores the smoothed image in the level-value-limited image #4 DB 27.

In this way, the LPF #0 to LPF #4 generate smoothed images that are smoothed by using the level values that are respectively set and store the smoothed images in the level-value-limited image #0 DB 23 to the level-value-limited image #4 DB 27 that correspond to the respective.

The synthesis processing unit 34 selects one or a plurality of conversion images from the plurality of level-value-limited conversion images generated by the filter processing unit 33 and synthesizes the selected images to generate a synthesis image. Specifically, the synthesis processing unit 34 selects a level-value-limited conversion image corresponding to the level value of each pixel of the input image from the level-value-limited image #0 DB 23 to the level-value-limited image #4 DB 27. Then, the synthesis processing unit 34 synthesizes the plurality of level-value-limited conversion images selected for the pixels of the input image and generates one synthesis image (frame).

Figure 6:
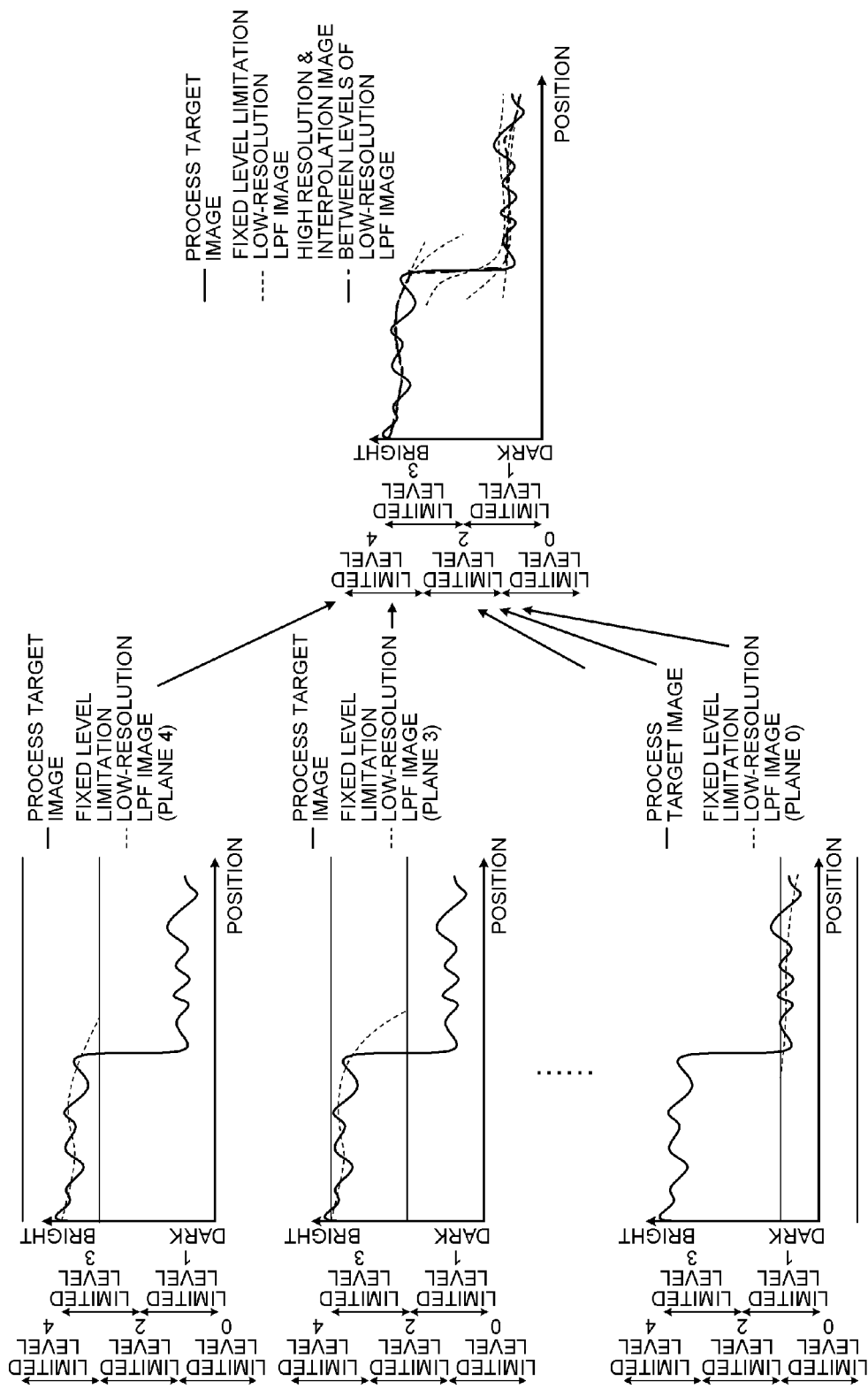
FIG. 6 is a diagram explaining a synthesis process.

As an example, as illustrated in FIG. 6, the synthesis processing unit 34 refers to each pixel of the conversion image received from the gradation converting unit 31, selects a level-value-limited conversion image (plane) corresponding to the level value of each pixel from the level-value-limited image #0 DB 23 to the level-value-limited image #4 DB 27, synthesizes the plurality of selected level-value-limited conversion images to generate one synthesis image (frame), and outputs the synthesis image to the gradation inverse-conversion unit 35 to be described below. FIG. 6 is a diagram explaining a synthesis process.

The gradation inverse-conversion unit 35 performs inverse conversion of the gradation conversion performed by the gradation converting unit 31 on the synthesis image generated by the synthesis processing unit 34, and generates a smoothed image that is converted to have the same gradation as that of the input image. As a specific example, the gradation inverse-conversion unit 35 acquires a gradation correction curve (see FIG. 4) that is performed by a gradation conversion opposite to the gradation conversion that is performed on the input image stored in the gradation correction curve DB 22, performs the gradation conversion on the synthesis image generated by the synthesis processing unit 34 on the basis of the gradation correction curve, generates a smoothed image that is converted to have the same gradation as that of the input image, and stores the smoothed image in the smoothed image DB 28.

The image output unit 40 outputs the generated smoothed image to another device that is connected thereto. As a specific example, the image output unit 40 acquires the smoothed image generated by the gradation inverse-conversion unit 35 from the smoothed image DB 28 and outputs the smoothed image to a dynamic range device that generates an image by performing, for example, a dynamic range compression by which a backlight image or the like is cleaned.

Process by Image Processing Apparatus

Figure 7:
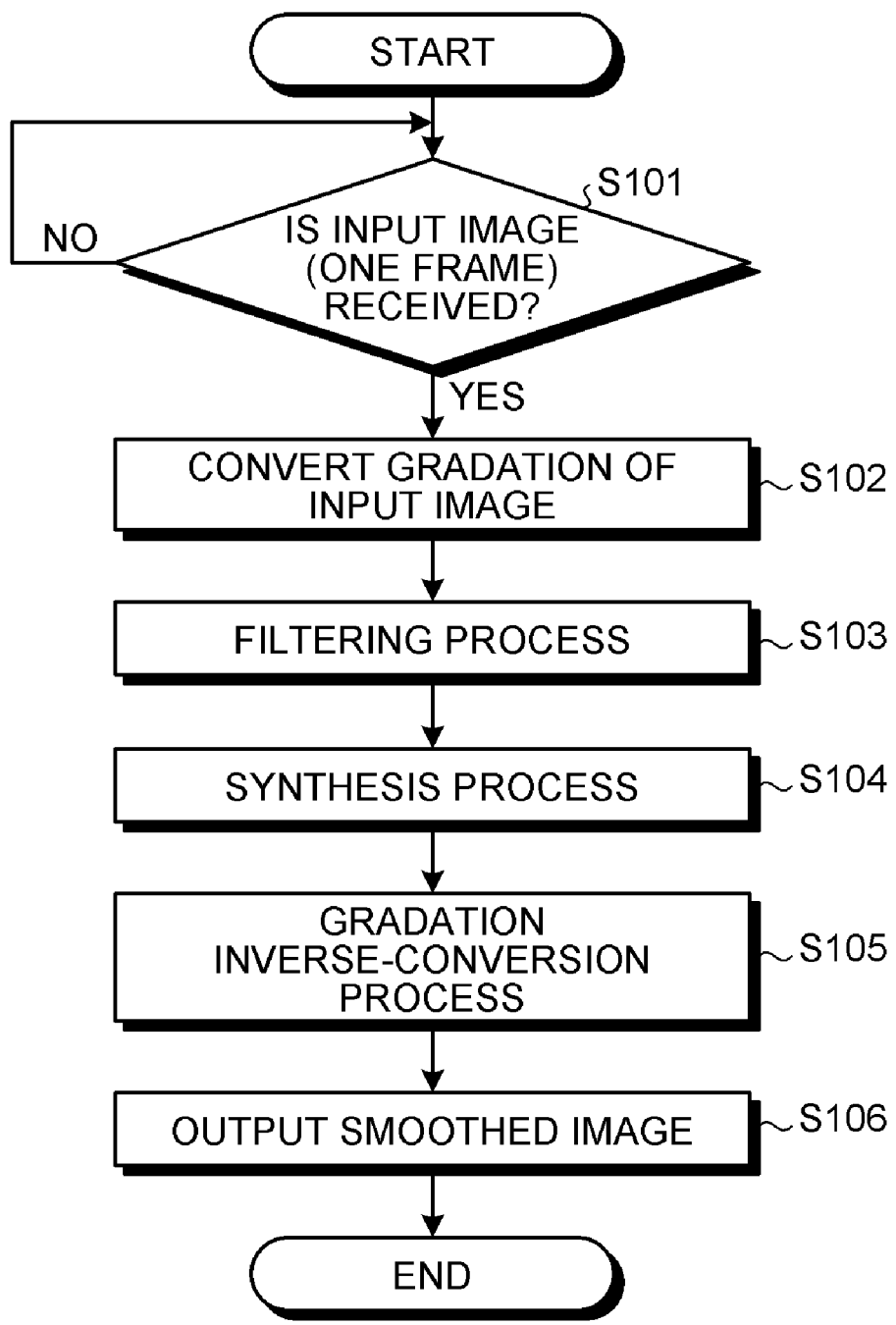
FIG. 7 is a flowchart illustrating a flow of a smoothed image generation process performed by the image processing apparatus according to the first embodiment.

It will be explained about a process performed by the image processing apparatus with reference to FIG. 7. FIG. 7 is a flowchart illustrating a flow of a smoothed image generation process performed by the image processing apparatus according to the first embodiment.

As illustrated in FIG. 7, when an input image is received by the input image receiving unit 11 of the image processing apparatus 10 (Step S101: YES), the gradation converting unit 31 converts the gradation of the received input image and generates a conversion image (Step S102).

As a specific example, when an input image is received by the input image receiving unit 11 of the image processing apparatus 10 and is stored in the input image DB 21, the gradation converting unit 31 acquires the received input image from the input image DB 21 and a gradation correction curve for gradation conversion from the gradation correction curve DB 22, converts the gradation of the input image acquired from the input image DB 21 to generate a conversion image by using the acquired gradation correction curve, and outputs the generated conversion image to the filter processing unit 33 and the synthesis processing unit 34.

Next, the filter processing unit 33 of the image processing apparatus 10 performs a filtering process by using filters of which the level value (gradation value) ranges are previously set and generates a plurality of filtering results (Step S103).

As a specific example, the LPF #0 to LPF #4 of the filter processing unit 33 perform a plurality of smoothing processes corresponding to a plurality of preset level values (gradation values) on the pixels of the conversion image received from the gradation converting unit 31, generate a plurality of level-value-limited conversion images, and store the generated conversion images in the level-value-limited image #0 DB 23 to the level-value-limited image #4 DB 27.

Then, the synthesis processing unit 34 of the image processing apparatus 10 selects one or a plurality of conversion images from the plurality of level-value-limited conversion images generated by the filter processing unit 33 and synthesizes the selected images to generate a synthesis image (Step S104).

As a specific example, the synthesis processing unit 34 selects a level-value-limited conversion image corresponding to the level value of each pixel of the conversion image generated by the gradation converting unit 31 from the plurality of level-value-limited conversion images generated by the filters. Then, the synthesis processing unit 34 synthesizes the plurality of level-value-limited conversion images selected for the pixels of the input image, generates one synthesis image (frame), and outputs the synthesis image to the gradation inverse-conversion unit 35.

Next, the gradation inverse-conversion unit 35 of the image processing apparatus 10 performs an inverse conversion of the gradation conversion performed by the gradation converting unit 31 on the synthesis image generated by the synthesis processing unit 34, and generates a smoothed image that is converted to have the same gradation as that of the input image (Step S105).

As a specific example, the gradation inverse-conversion unit 35 acquires a gradation correction curve for gradation inverse conversion that is stored in the gradation correction curve DB 22, performs a gradation inverse conversion on the synthesis image received from the synthesis processing unit 34 by using the acquired gradation correction curve, generates a smoothed image, and stores the generated smoothed image in the smoothed image DB 28.

After that, the image output unit 40 of the image processing apparatus 10 outputs the generated smoothed image to another device that is connected thereto (Step S106). As a specific example, the image output unit 40 acquires the smoothed image generated by the gradation inverse-conversion unit 35 from the smoothed image DB 28, and outputs the smoothed image to, for example, a dynamic range device that generate an image by performing a dynamic range compression by which a backlight image is cleaned.

Effect by First Embodiment

In this way, according to the first embodiment, because the image processing apparatus performs a gradation conversion on an input image to generate a conversion image, performs the plurality of smoothing processes corresponding to the plurality of preset level values on the generated conversion image or the first generation image generated from the conversion image to generate the plurality of level-value-limited conversion images, selects one or the plurality of conversion images from the plurality of generated level-value-limited conversion images, synthesizes the selected images to generate a synthesis image, and performs a gradation conversion on the generated synthesis image to generate a smoothed image that is converted to have the same gradation as that of the input image, a processing load is reduced and a process can be speeded up.

Moreover, according to the first embodiment, because the image processing apparatus performs an inverse conversion of the gradation conversion performed by the gradation inverse-conversion unit 35 on the generated synthesis image and generates a smoothed image that is converted to have the same gradation as that of the input image, the deviance between the gradation of the input image and the gradation of the generated smoothed image can be strongly prevented.

Moreover, according to the first embodiment, because the image processing apparatus performs a gradation conversion on an input image to generate a conversion image in such a manner that the number of gradations near achromatic color that has many color difference component distributions in the input image is increased, a processing load is reduced and a process can be speeded up even when noises having a large granularity and a small amplitude are removed.

For example, when the digitizing filters (LPF #0 to LPF #4) divides (digitizes) an input image into a plurality of planes (level values) on the basis of the value of each pixel, a process level density (an absolute number processed by a filter corresponding to a medium value) adjacent to a medium value (adjacent to achromatic color) of the level values (gradation values) on which a color difference component particularly having an effective result concentrates can be raised by using the digitizing filters (LPF #0 to LPF #4) by converting the gradation of the input image by using the gradation correction curve. As a result, noises having large granularity and small amplitude can be removed without preparing filters of which the levels are finely divided, and a processing load is reduced and a process can be speeded up.

[b] Second Embodiment

However, in the first embodiment, it has been explained about the case where the image processing apparatus converts the gradation of an input image and then performs a filtering process on the converted image to generate a smoothed image. However, the present invention is not limited to this. After generating a conversion image that is obtained by converting the gradation of an input image, an image processing apparatus can generate a reduced image that is obtained by reducing the conversion image and perform a filtering process on the reduced image to generate a smoothed image.

Therefore, in the second embodiment, it will be explained about the case where an image processing apparatus generates a conversion image that is obtained by converting the gradation of an input image, generates a reduced image that is obtained by reducing the conversion image, performs a filtering process on the reduced image, and generates a smoothed image with reference to FIGS. 8 and 9.

Entire Configuration (Second Embodiment)

First, it will be explained about the entire configuration of an image processing apparatus according to the second embodiment with reference to FIG. 8. FIG. 8 is a diagram illustrating the entire configuration of an image processing apparatus according to the second embodiment.

Figure 8:
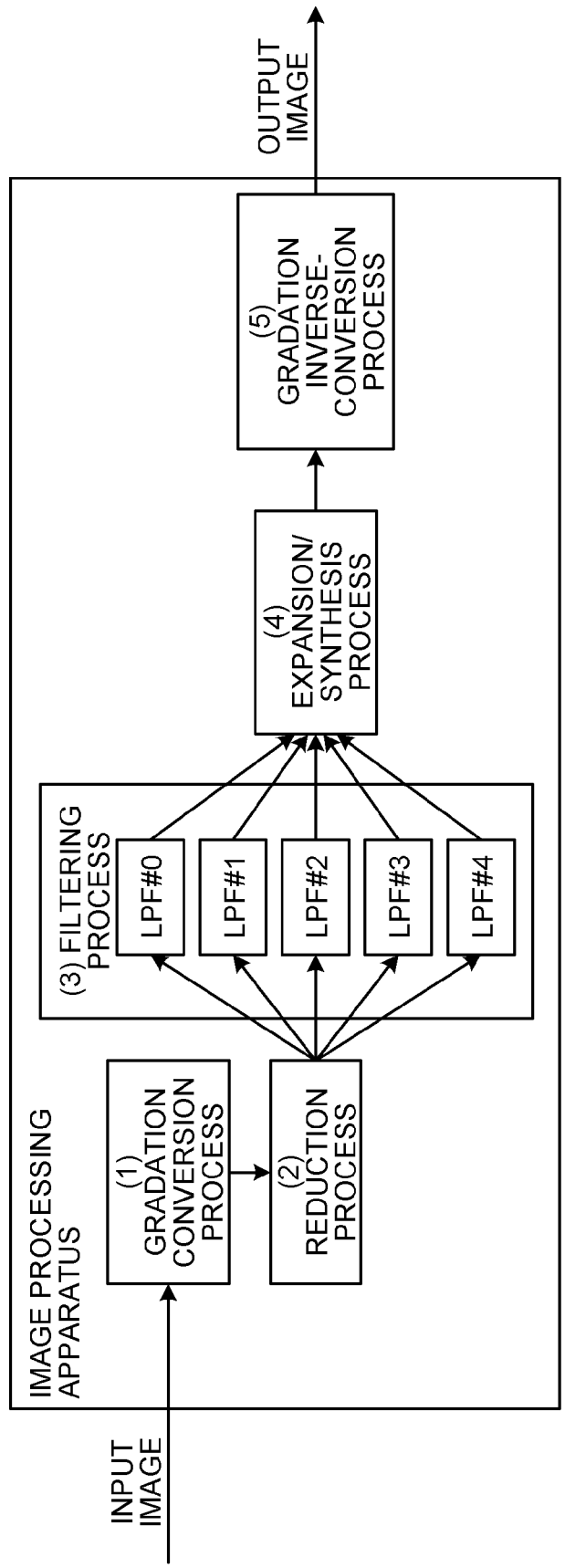
FIG. 8 is a diagram illustrating the entire configuration of an image processing apparatus according to a second embodiment.

As illustrated in FIG. 8, similarly to the first embodiment, the image processing apparatus includes digitizing epsilon filters (LPF #0 to LPF #4) that respectively have different level value (gradation value) ranges that are previously set, perform a smoothing process on an input image by using pixels within a level value range that is set thereon as processing targets, and generate level-value-limited smoothed images.

In such a configuration, when an image to be processed that is one frame of moving image data is input, the image processing apparatus converts the gradation of the input image to generate a conversion image, similarly to the first embodiment (see (1) of FIG. 8). As a specific example, when an input image to be processed that is one frame of moving image data is input, the image processing apparatus converts the gradation of the input image to generate a conversion image on the basis of the gradation correction curve that is previously stored.

Then, the image processing apparatus generates a reduced image that is obtained by reducing the conversion image of which the gradation is converted (see (2) of FIG. 8). As a specific example, the image processing apparatus performs a reduction process for reducing the conversion image of which the gradation is converted to a predetermined reduction ratio (for example, a half) that is previously set by an administrator, and outputs the generated reduced image to the filters (LPF #0 to LPF #4).

After that, similarly to the first embodiment, the image processing apparatus performs a plurality of smoothing processes corresponding to the plurality of preset level values on the generated reduced image and generates a plurality of level-value-limited conversion images (see (3) of FIG. 8). As a specific example, the image processing apparatus performs five smoothing processes corresponding to five level values that are previously set by using the LPF #0 to LPF #4, and generates five level-value-limited conversion images (level-value-limited conversion image #0 to level-value-limited conversion image #4).

Next, the image processing apparatus selects one or a plurality of conversion images from the plurality of level-value-limited conversion images generated by the filters, synthesizes the selected images, generates a synthesis image, and expands the generated synthesis image (see (4) of FIG. 8). As a specific example, the image processing apparatus selects a level-value-limited conversion image corresponding to the level value of each pixel of the input image from the plurality of level-value-limited conversion images generated by the filters. Then, the image processing apparatus synthesizes the plurality of level-value-limited conversion images selected for the pixels of the input image and generates one image (frame). Then, the image processing apparatus expands the generated synthesis image to have the same magnification as that of the original input image.

After that, similarly to the first embodiment, the image processing apparatus performs a gradation inverse conversion on the generated synthesis image and generates a smoothed image that is converted to have the same gradation as that of the input image (see (5) of FIG. 8). When specifically explaining the above-described example, the image processing apparatus previously stores a gradation correction curve that is obtained by a gradation conversion opposite to the gradation conversion that is performed on the input image with respect to the generated synthesis image and performs the gradation conversion on the basis of the gradation correction curve so as to generate a smoothed image that is converted to have the same gradation as that of the input image.

In this way, the image processing apparatus according to the second embodiment can convert the gradation of an input image to generate a reduced image and perform a filtering process on the generated reduced image. As a result, a processing load is reduced and a process can be speeded up.

Configuration of Image Processing Apparatus (Second Embodiment)

Next, it will be explained about the configuration of the image processing apparatus according to the second embodiment with reference to FIG. 9. FIG. 9 is a block diagram illustrating the configuration of the image processing apparatus 10 according to the second embodiment.

Figure 9:
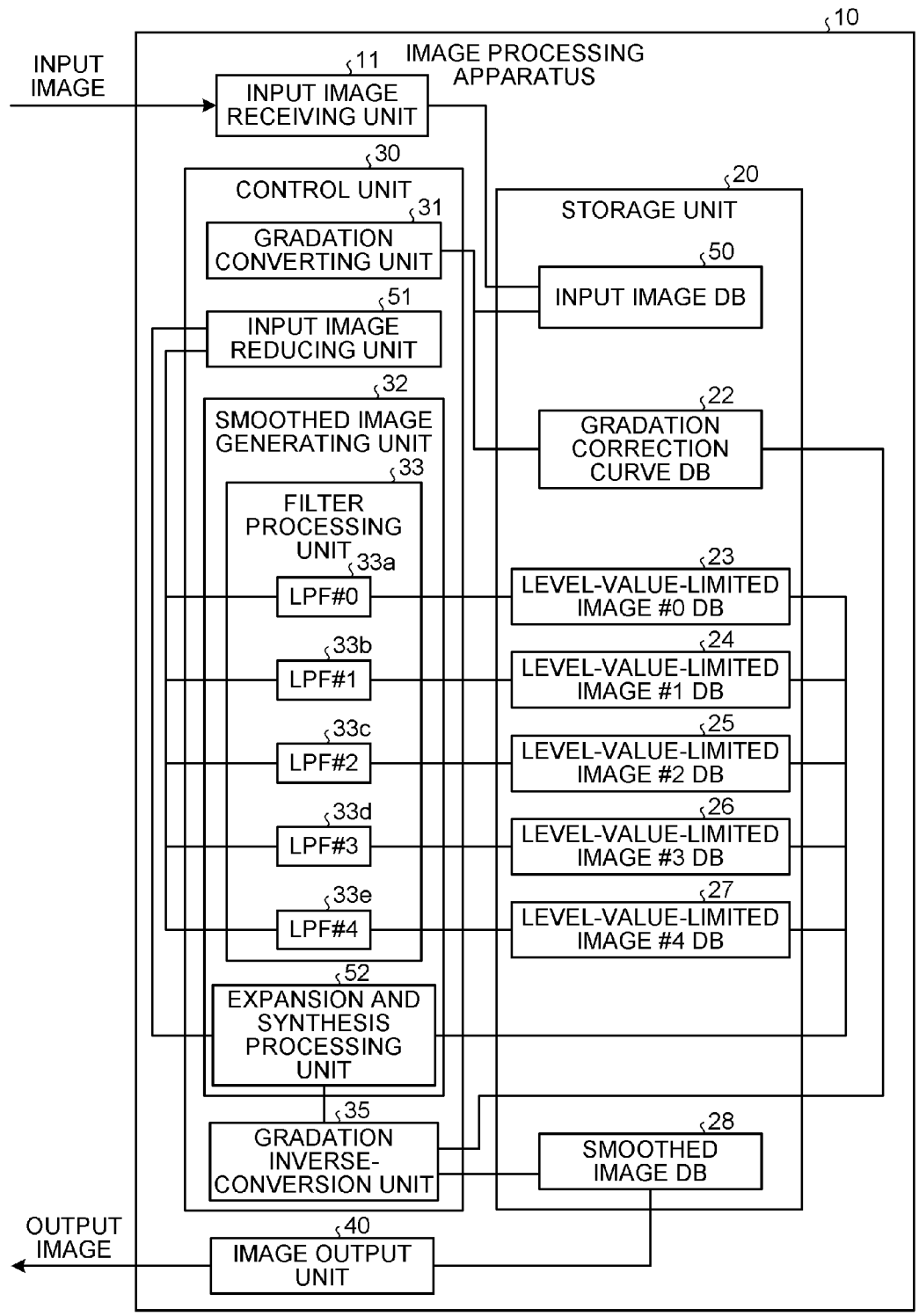
FIG. 9 is a block diagram illustrating the configuration of the image processing apparatus according to the second embodiment.

As illustrated in FIG. 9, the image processing apparatus 10 includes the input image receiving unit 11, the storage unit 20, the control unit 30, and the image output unit 40. Because the input image receiving unit 11, the storage unit 20, the gradation converting unit 31, the filter processing unit 33, and the gradation inverse-conversion unit 35 of the control unit 30, and the image output unit 40 among them have the same functions as those of the first embodiment, it will be explained about an input image reducing unit 51 and an expansion and synthesis processing unit 52 that have functions different from those of the first embodiment.

The input image reducing unit 51 generates a reduced image that is obtained by reducing the input image received by the input image receiving unit 11. As a specific example, when receiving the conversion image of the input image of which the gradation is converted from the gradation converting unit 31, the input image reducing unit 51 performs a reduction process for reducing the conversion image to a predetermined reduction ratio (for example, a half) that is previously set by an administrator and outputs the generated reduced image to the filters (LPF #0 to LPF #4).

The expansion and synthesis processing unit 52 selects one or a plurality of conversion images from the plurality of level-value-limited conversion images generated by the filter processing unit 33, synthesizes the selected images, generates a synthesis image, and expands the generated synthesis image to have the same magnification as the original input image. Specifically, similarly to the first embodiment, the expansion and synthesis processing unit 52 selects a level-value-limited conversion image corresponding to the level value of each pixel of the input image from the level-value-limited image #0 DB 23 to the level-value-limited image #4 DB 27. Then, the expansion and synthesis processing unit 52 synthesizes the plurality of level-value-limited conversion images selected for the pixels of the input image and generates one synthesis image (frame).

Then, because the synthesis image that is synthesized in this way is an image that is synthesized by filtering on the basis of the reduced image that is obtained by reducing the original input image, the synthesis image is a reduced image. Therefore, the expansion and synthesis processing unit 52 generates a synthesis image of which the magnification has the same as that of the original input image by multiplying the magnification reduced by the input image reducing unit 51 by the synthesized synthesis image (for example, two times when a reduction ratio is a half), and outputs the generated synthesis image to the gradation inverse-conversion unit 35.

Effect by Second Embodiment

In this way, according to the second embodiment, because the image processing apparatus can convert the gradation of an input image to generate a reduced image and perform a filtering process on the generated reduced image, a processing load is reduced and a process can be speeded up.

[c] Third Embodiment

It has been explained about the case where the image processing apparatus performs a gradation conversion and a gradation inverse conversion by using a gradation correction curve that is previously stored in the first and second embodiments. However, the present invention is not limited to this. The image processing apparatus can create a gradation correction curve for each input image and perform a gradation conversion and a gradation inverse conversion by using the created gradation correction curve.

Therefore, in the third embodiment, it will be explained about the case where a gradation correction curve is created for each input image with reference to FIGS. 10 to 13. In this case, because processes for performing a gradation conversion and a gradation inverse conversion by using the created gradation correction curve are similar to those of the first and second embodiments, the detailed descriptions are omitted.

In the third embodiment, it will be explained about the noise rejection of the color difference component of an image. For example, a color difference component corresponds to two components of "CbCr" among three components of "YCbCr" that are generally used in an image processing field. In the third embodiment, on the assumption that eight-bit data of 0 to 255 is processed (in this case, achromatic colors of "Cb" and "Cr" correspond to 128), a procedure for setting the shape of previous-stage and subsequent-stage gradation conversion curves is illustrated. Basically, a gradation correction curve is determined in accordance with the frequency distribution of a color difference component of an input image.

Figure 10:
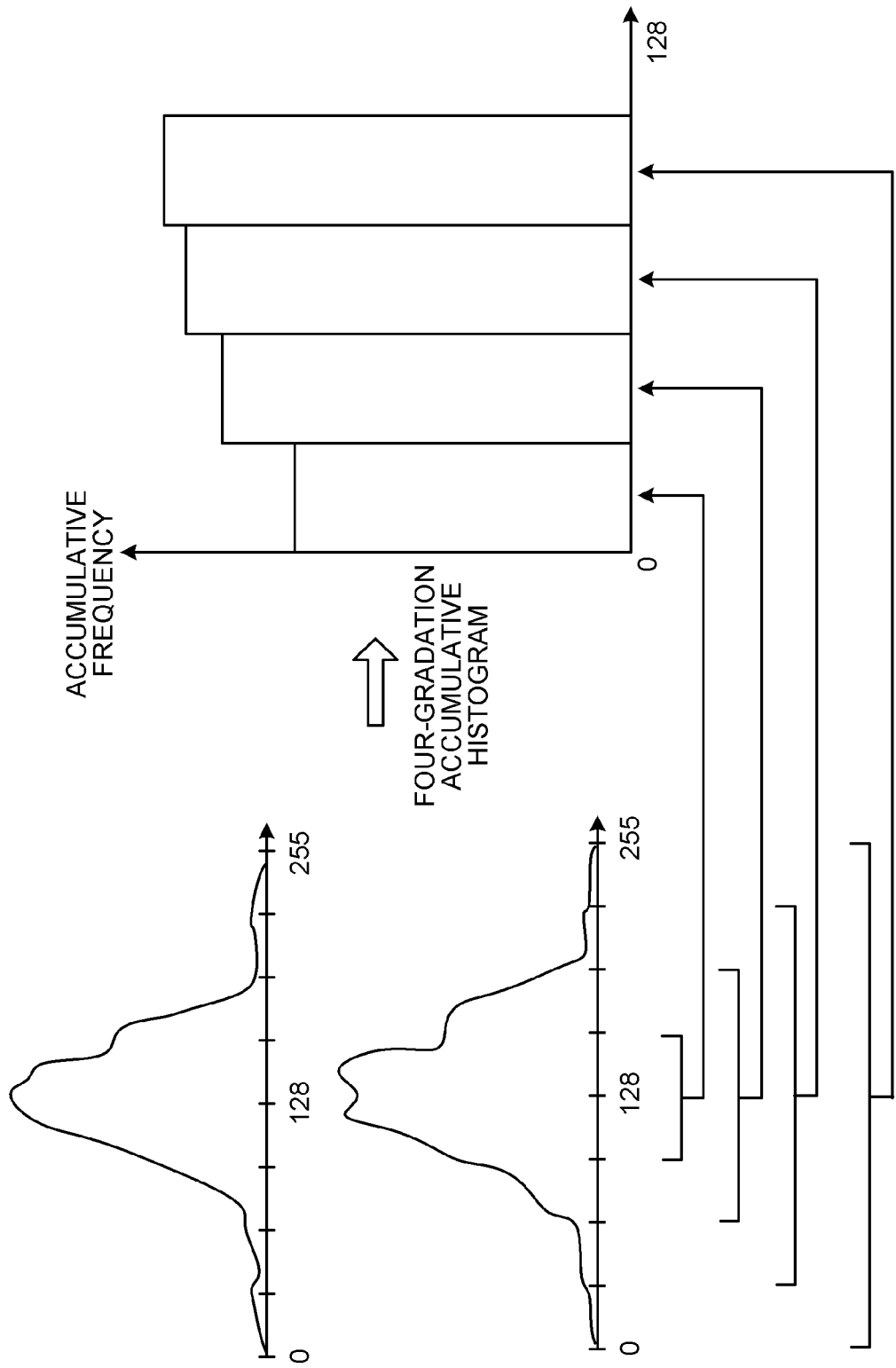
FIG. 10 is a diagram illustrating an example of dividing a color difference component into four gradations.

First, the histogram of a color difference component is generated. As illustrated in FIG. 10, a histogram is, for example, generated with four gradations. Basically, the histogram for four gradations is produced by using a level difference as a standard with a central focus on 128. When eight-bit data of 0 to 255 is processed, a histogram is produced in such a manner that an interval that the difference with 128 is "0 to 31" is a first class, an interval that the difference is "32 to 64" is a second class, and the like. In this case, the frequency of both components of "Cb" and "Cr" is added up. FIG. 10 is a diagram illustrating an example of dividing a color difference component into four gradations.

Figure 11:
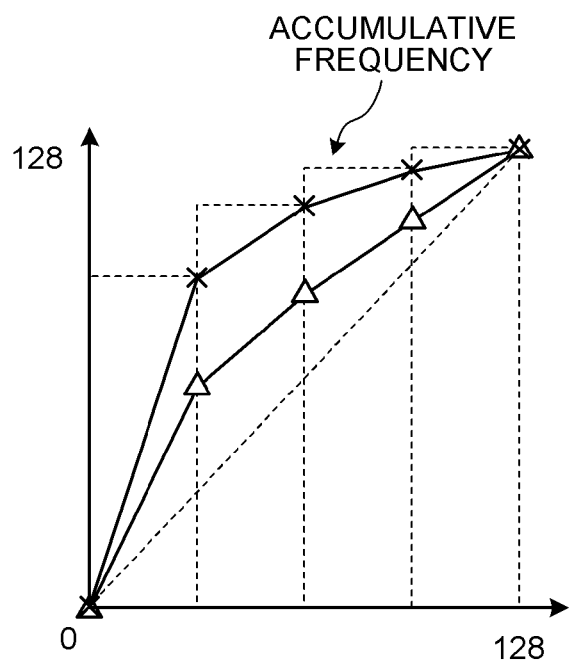
FIG. 11 is a diagram illustrating an example of converting a histogram into an accumulation frequency distribution.

Next, the control point of a temporary gradation correction curve is generated from the histogram created by the technique. Specifically, as illustrated in FIG. 11, the image processing apparatus converts a histogram into an accumulation frequency distribution, divides a proportion for all pixels of the frequency of the accumulation frequency distribution, and associates the divided proportions with the classes. As an example, when the cumulative value of the n-th class is "Kn" and all cumulative numbers is "Ka", a control point corresponding to the n-th class (n is 1 to 4) can be (input, output) =(32n, 138*Kn/Ka) (rounding after the decimal point). FIG. 11 is a diagram illustrating an example of converting a histogram into an accumulation frequency distribution.

Figure 12:
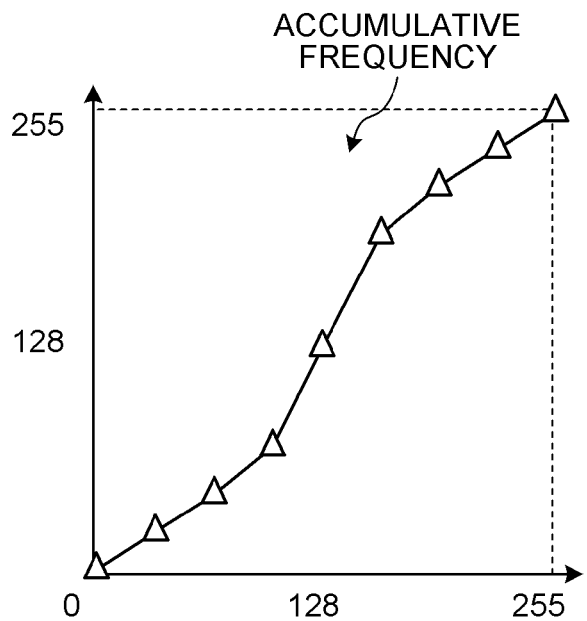
FIG. 12 is a diagram illustrating a control point of a gradation correction curve.

The curve may be used as the control point of a previous-stage gradation correction curve without modification. However, a gradation change may be slightly extreme in some cases. Therefore, in the third embodiment, an intermediate characteristic of a gradation correction curve of "input=output" is used. Specifically, (0, 0) is added to the following control point. Furthermore, as illustrated in FIG. 12, a curve obtained by symmetrically connecting two is created. For example, when linear interpolation is applied to lines between points, the previous-stage side can be obtained as (input, output)=(32n, (128×Kn/Ka+32n)/2) and the subsequent-stage side can be obtained as an inverse of the input and output of the present characteristic, for example, by symmetrically connecting (input, output)=((255×Kn/Ka+32n)/2, 32n). FIG. 12 is a diagram illustrating a control point of a gradation correction curve.

Figure 13:
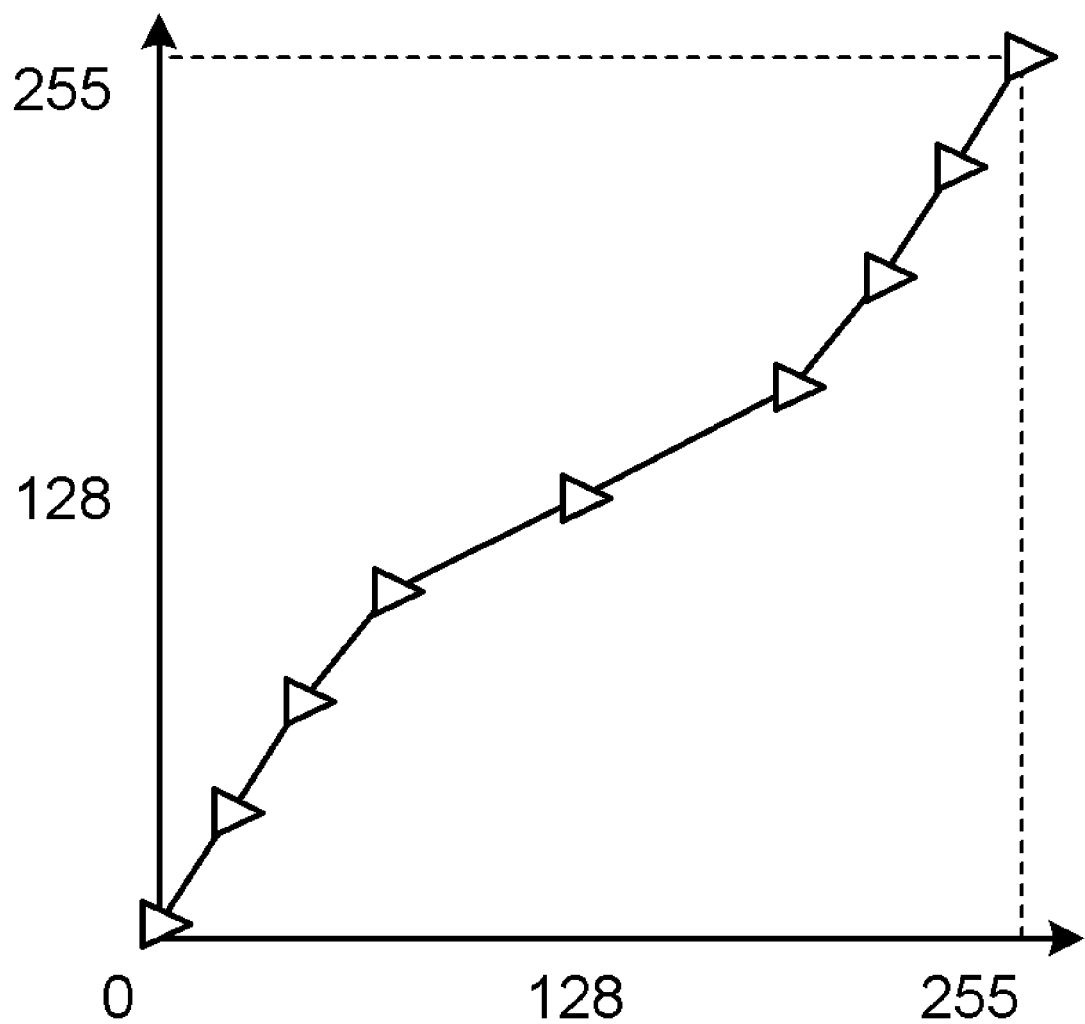
FIG. 13 is a diagram illustrating an example of generating the gradation correction curve.

In other words, as illustrated in FIG. 13, a curve that is obtained by connecting the previous-stage curve and the subsequent-stage curve obtained by reversing the previous-stage input and output at "128" is generated as the gradation correction curve of an input image. In the above connection, although 256 coordinates occurs, the coordinate is moved to 255. Moreover, a gradation correction curve that is used for gradation inverse conversion can be created by reversing the input and output of the generated gradation correction curve. FIG. 13 is a diagram illustrating an example of generating a gradation correction curve.

As a result, a curve for increasing a gradation difference of a high portion (usually, near achromatic color) of data frequency is generated, and thus an effect for narrowing a substantially discrete level difference is obtained in the high-frequency portion. In this case, as in the third embodiment, the determination of a gradation curve should not be necessarily performed in association with data distribution. Generally, because the distribution of a color difference component concentrates in the vicinity of achromatic color, an effect can be obtained if the previous-stage side is an S character and the subsequent-stage side is an inverse S character. When it is necessary to suppress a processing load as much as possible, it is effective to previously decide the shape of a curve.

As above, it has been explained about the noise rejection of a color difference component. As for the noise rejection of a brightness component (Y component), it is desirable that an inverse gradation conversion of a gradation conversion (γ conversion performed in image capturing by a camera) for input is performed at the previous stage and a conversion equal to the gradation conversion is performed at the subsequent stage. A noise component is mostly appended during capturing an image. The noise appended during capturing an image gives a difference to amplitude by brightness in accordance with γ conversion. Therefore, if noise is removed by a digitizing epsilon filter after the conversion of an inverse characteristic, noise rejection becomes possible by using constant amplitude as a standard regardless of a level.

[d] Fourth Embodiment

Till now, although it has been explained about the embodiments of the present invention, the present invention may be performed by various different configurations in addition to the embodiments described above. Therefore, as described below, another embodiment is explained by dividing the embodiment into (1) the number of filters, (2) a gradation correction curve, (3) the number of significant digits, (4) an interpolation operation, (5) a system configuration, and (6) a program.

(1) Number of Filters

For example, it has been explained about the case where the number of filters is five (LPF #0 to LPF #4) in the first and second embodiments. However, the number of filters is not limited to this. The number of filters may be three or ten. Moreover, a level range (gradation range) set in each filter is not limited to the examples described in the first and second embodiments and can be arbitrarily set.

(2) Gradation Correction Curve

Although it has been explained about the case where a gradation correction curve is previously stored in the first and second embodiments and a gradation correction curve in accordance with an input image is generated in the third embodiment, the image processing apparatus may acquire the gradation distribution of an input image, and may store or generate a gradation correction curve obtained by performing a gradation conversion according to the bias of the acquired gradation distribution or store or generate a gradation correction curve obtained by performing a gradation conversion that weakens the effect of a gradation conversion (for example, γ conversion that is captured by a camera and is already performed) performed on the input image.

(3) Number of Significant Digits

Although it has been explained about a noise rejection technology for color difference and brightness in the third embodiment, gradation defect occurs in subsequent-stage nonlinear processing when input and output are together eight-bit data. Therefore, it is desirable that the number of output bits of the synthesis process of the digitizing epsilon filter is nine bits or more and the input value of gradation conversion of an output side is adapted to the number of bits of the synthesis process. Because a synthesis process is performed by an interpolation operation, the output bit of the synthesis process can be easily increased if the significant digit of the interpolation operation is increased.

(4) Interpolation Operation

According to the present invention, when the digitizing epsilon filter that is used for the process performs a smoothing process on a reduced image and returns the resolution of the reduced image to the original resolution, it is preferable to reduce a processing load by performing an interpolation operation. Moreover, various interpolation methods such as a two-dimensional interpolation operation or a three-dimensional interpolation operation can be used as a technique for an interpolation operation.

(5) System Configuration

Among the processes described in the present embodiments, the whole or a part of processes (for example, a process of receiving an input image) that have been automatically performed can be manually performed. Also, processing procedures, control procedures, concrete titles, and information including various types of data and parameters (for example, FIG. 3, FIG. 4, FIGS. 10 to 13, and the like), which are described in the document and the drawings, can be arbitrarily changed except that they are specially mentioned.

Each component of each device illustrated in the drawings is a functional concept. Therefore, these components are not necessarily constituted physically as illustrated in the drawings. In other words, the specific configuration of dispersion and integration of each device is not limited to the illustrated configuration. Therefore, all or a part of each device can dispersed or integrated functionally or physically in an optional unit in accordance with various types of loads or operating conditions (for example, the integration of the input image receiving unit and the gradation converting unit). Furthermore, all or a part of each process function performed by each device can be realized by CPU and a program that is analyzed and executed by the CPU or can be realized by a hardware by wired logic.

(6) Program

Various types of processes explained in the embodiments can be realized by executing a previously-prepared program by using a computer system such as a personal computer or a workstation. Therefore, a computer system that executes a program having the same functions as those of the embodiments is below explained as another embodiment.

Figure 14:
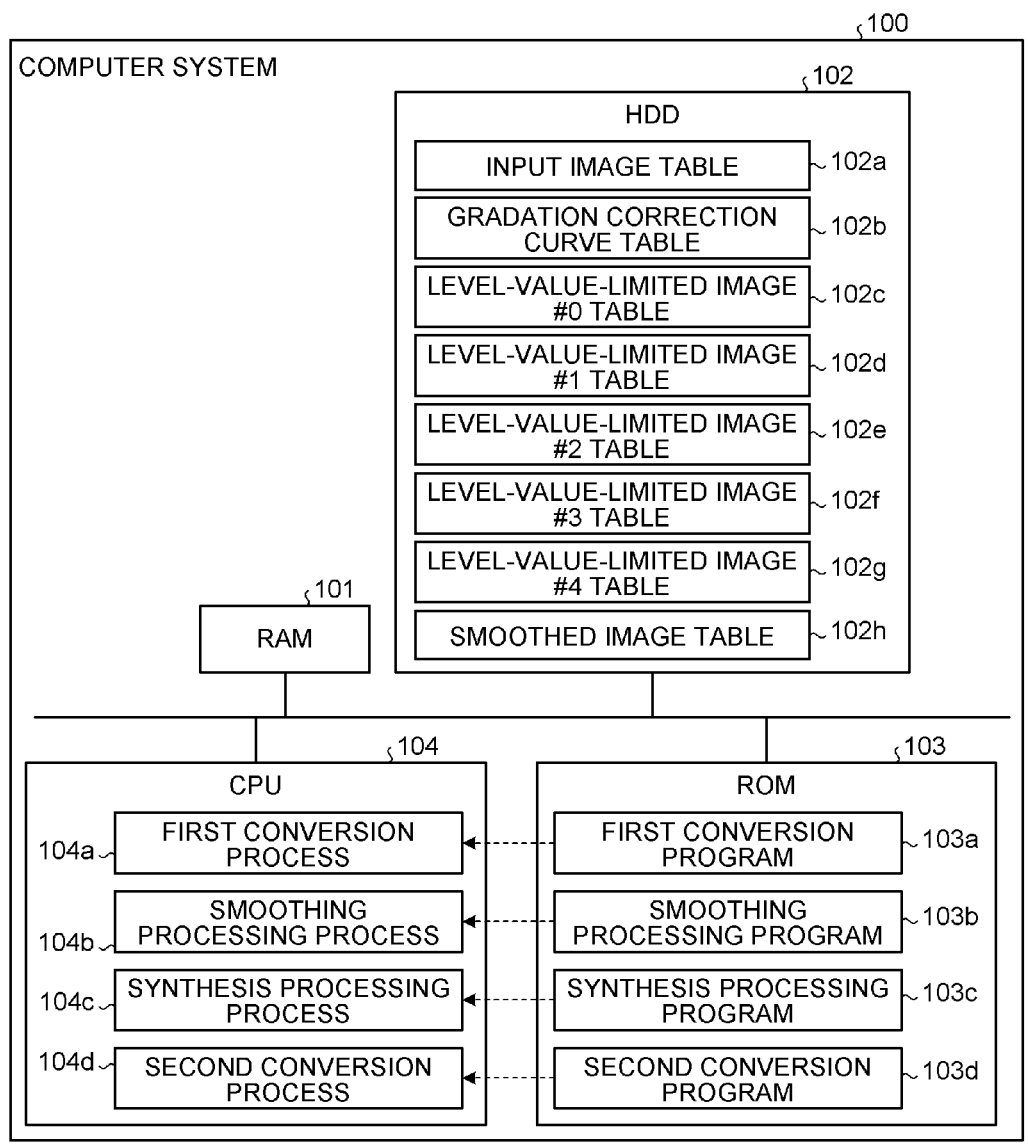
FIG. 14 is a diagram illustrating an example of a computer system that executes an image processing program.
Figure 15:
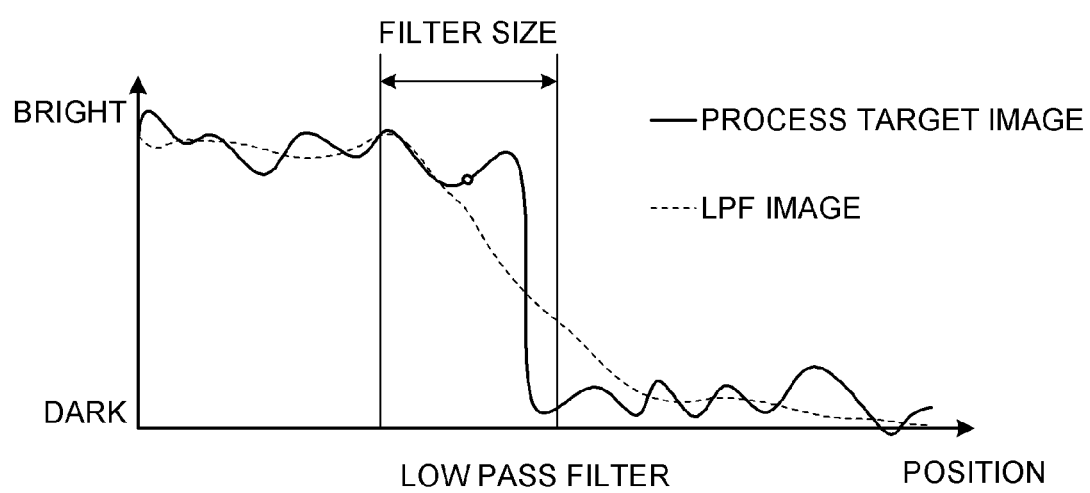
FIG. 15 is a diagram explaining a conventional system.
Figure 16:
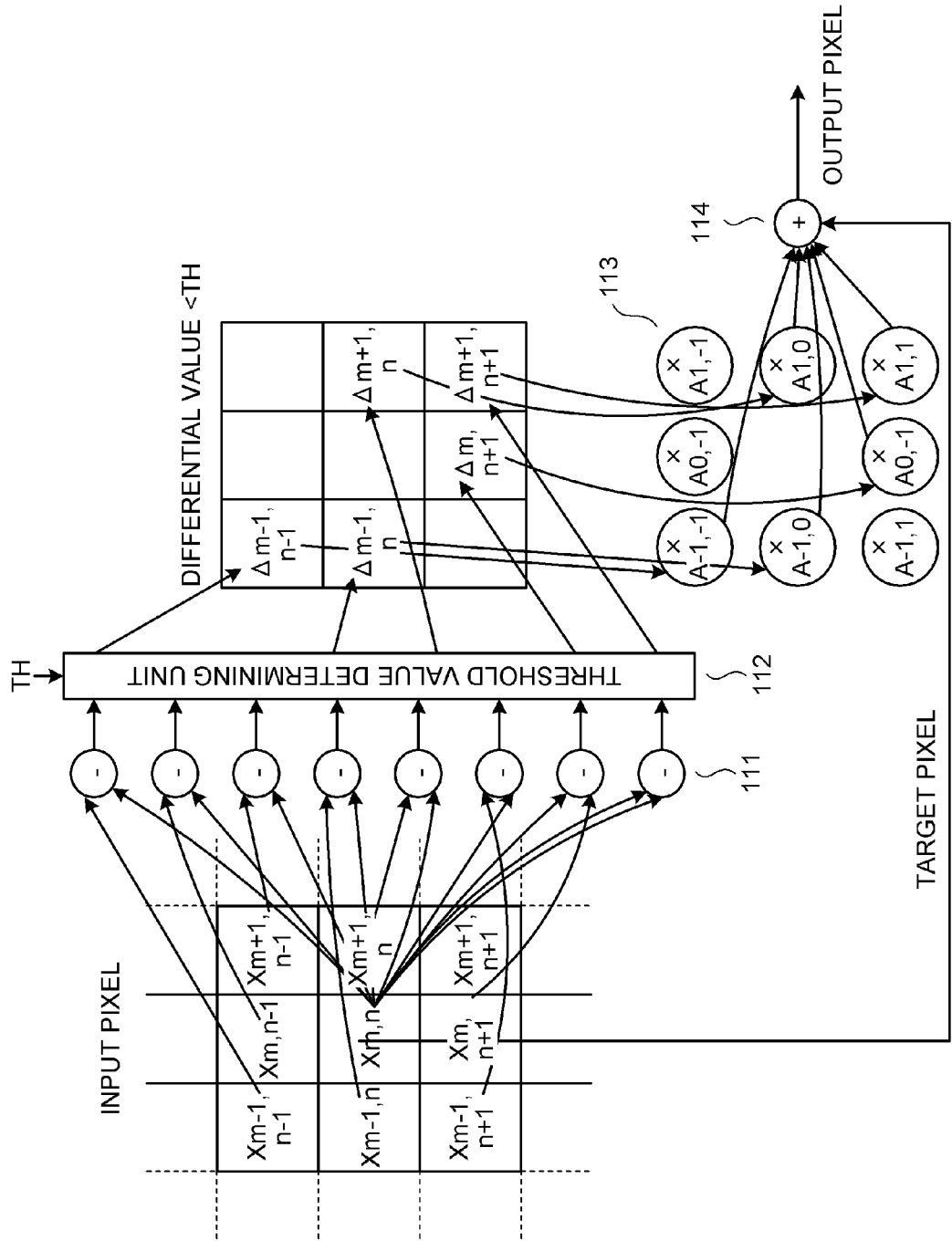
FIG. 16 is a diagram explaining the conventional system.
Figure 17:
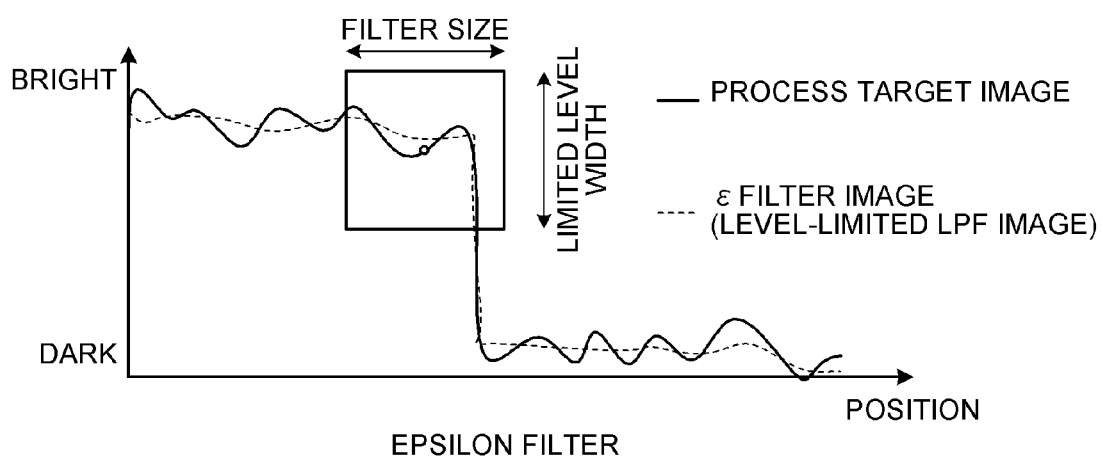
FIG. 17 is a diagram explaining the conventional system.

FIG. 14 is a diagram illustrating an example of a computer system 100 that executes an image processing program. As illustrated in FIG. 14, the computer system 100 includes a RAM 101, an HDD 102, a ROM 103, and a CPU 104. In this case, the ROM 103 previously stores therein a program having the same functions as those of the embodiments. In other words, as illustrated in FIG. 14, the ROM 103 previously stores a first conversion program 103a, a smoothing processing program 103b, a synthesis processing program 103c, and a second conversion program 103d.

The CPU 104 reads out and executes the programs 103a to 103d to function as a first conversion process 104a, a smoothing processing process 104b, a synthesis processing process 104c, and a second conversion process 104d as illustrated in FIG. 14. In this case, the first conversion process 104a corresponds to the gradation converting unit 31 illustrated in FIG. 2, the smoothing processing process 104b corresponds to the filter processing unit 33, the synthesis processing process 104c corresponds to the synthesis processing unit 34, and the second conversion process 104d corresponds to the gradation inverse-conversion unit 35.

Moreover, the HDD 102 includes an input image table 102a that stores an input frame, a gradation correction curve table 102b that stores a gradation correction curve that is used for gradation conversion, a level-value-limited image #0 table 102c to a level-value-limited image #4 table 102g that store level-value-limited smoothed images that are generated by the smoothing processing process 104b, and a smoothed image table 102h that stores the generated smoothed images. In this case, the input image table 102a corresponds to the input image DB 21 illustrated in FIG. 2, the gradation correction curve table 102b corresponds to the gradation correction curve DB 22, the level-value-limited image #0 table 102c to the level-value-limited image #4 table 102g correspond to the level-value-limited image #0 DB 23 to the level-value-limited image #4 DB 27, and the smoothed image table 102h corresponds to the smoothed image DB 28.

However, the programs 103a to 103d are not necessarily stored in the ROM 103. For example, the programs 103a to 103d may be stored in a "transportable physical medium" such as a flexible disk (FD), a CD-ROM, a magnet-optical disk, a DVD disc, or an IC card that are inserted into the computer system 100, a "fixed physical medium" such as a hard disk drive (HDD) that is provided inside and outside the computer system 100, and further "another computer system" that is connected to the computer system 100 via a public line, Internet, LAN, WAN, or the like, so that the computer system 100 can read out and execute the programs from these media.

As described above, according to an aspect of the present invention, a processing load is reduced and thus a process can be speeded up.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
a first converting unit that performs a gradation conversion on an input image to generate a conversion image;
a smoothed image generating unit that performs a smoothing process on the conversion image generated by the first converting unit or a first generation image generated from the conversion image to generate a plurality of level-value-limited conversion images, the smoothing process smoothing pixels within different ranges of level values with a filter having a same filter size;
a synthesis processing unit that selects at least one of the level-value-limited conversion images generated by the smoothed image generating unit and synthesizes the at least one of the level-value-limited conversion images to generate a synthesis image; and
a second converting unit that performs a gradation conversion on the synthesis image generated by the synthesis processing unit to generate a smoothed image that is converted to have a same gradation as that of the input image.

2. The image processing apparatus according to claim 1, wherein the second converting unit performs an inverse conversion of the gradation conversion performed by the first converting unit on the synthesis image generated by the synthesis processing unit to generate a smoothed image that is converted to have a same gradation as that of the input image.

3. The image processing apparatus according to claim 1, wherein the first converting unit performs the gradation conversion on the input image, in such a manner that a number of gradations near achromatic color that has many color difference component distributions in the input image is increased, to generate the conversion image.

4. The image processing apparatus according to claim 1, wherein the first converting unit acquires a gradation distribution of the input image and performs the gradation conversion according to a bias of the acquired gradation distribution on the input image to generate the conversion image.

5. The image processing apparatus according to claim 1, wherein the first converting unit performs the gradation conversion, which weakens an effect of the gradation conversion performed on the input image, on the input image to generate the conversion image.

6. The image processing apparatus according to claim 1, wherein the first converting unit generates, when performing the gradation conversion on the input image to generate the conversion image, the conversion image that has a number of significant digits more than a number of significant digits of the smoothed image generated by the second converting unit.

7. The image processing apparatus according to claim 1, wherein
the smoothed image generating unit uses pixels of the conversion image generated by the first converting unit or a reduced conversion image obtained by reducing the conversion image as target pixels, extracts pixels of which level values including target pixels within a size of a filter that performs the smoothing process for generating the smoothed image are within a level value range that is set for each filter, smoothes the level values of the extracted pixels, and generates a plurality of level-value-limited conversion images as smoothed results for the target pixels, and
the synthesis processing unit uses pixels of the conversion image generated by the first converting unit or a reduced conversion image obtained by reducing the conversion image as process target pixels, selects one or a plurality of level-value-limited conversion images from the plurality of level-value-limited conversion images for which a level value range including level values of the process target pixels is set to perform an expansion process on the selected images, and performs a synthesis process of using, as a synthesized result, a value that is computed from level values of smoothed results of pixels corresponding to positions of the process target pixels among the level-value-limited conversion images on which the expansion process is performed to generate a synthesis image.

8. The image processing apparatus according to claim 7, wherein the synthesis processing unit performs the expansion process and the synthesis process by using an interpolation operation.

9. The image processing apparatus according to claim 8, wherein the synthesis processing unit performs the expansion process and the synthesis process by using a three-dimensional interpolation operation.

10. An image processing method comprising:
performing a gradation conversion on an input image to generate a conversion image;
performing a smoothing process on the generated conversion image or a first generation image generated from the conversion image to generate a plurality of level-value-limited conversion images, the smoothing process smoothing pixels within different ranges of level values with a filter having a same filter size;
selecting at least one of the generated level-value-limited conversion images;
synthesizing the at least one of the level-value-limited conversion images to generate a synthesis image; and
performing a gradation conversion on the generated synthesis image to generate a smoothed image that is converted to have a same gradation as that of the input image.

11. The image processing method according to claim 10, wherein the performing the gradation conversion includes performing an inverse conversion of the gradation conversion performed to generate the conversion image, on the generated synthesis image, to generate a smoothed image that is converted to have a same gradation as that of the input image.

12. The image processing method according to claim 1, wherein the performing the gradation conversion on the input image includes increasing a number of gradations near achromatic color that has many color difference component distributions in the input image, to generate the conversion image.

13. The image processing method according to claim 10, wherein the performing the gradation conversion on the input image includes acquiring a gradation distribution of the input image and performing the gradation conversion according to a bias of the acquired gradation distribution on the input image to generate the conversion image.

14. The image processing method according to claim 10, wherein the performing the gradation conversion on the input image includes performing the gradation conversion, which weakens an effect of the gradation conversion performed on the input image, on the input image to generate the conversion image.

15. The image processing method according to claim 10, wherein the performing the gradation conversion on the input image includes generating, when performing the gradation conversion on the input image to generate the conversion image, the conversion image that has a number of significant digits more than a number of significant digits of the generated smoothed image.

16. The image processing method according to claim 10, wherein
the performing the smoothing process includes
using pixels of the generated conversion image or a reduced conversion image obtained by reducing the conversion image as target pixels,
extracting pixels of which level values including target pixels within a size of a filter that performs the smoothing process for generating the smoothed image are within a level value range that is set for each filter,
smoothing the level values of the extracted pixels, and
generating a plurality of level-value-limited conversion images as smoothed results for the target pixels, and the synthesizing includes
using pixels of the generated conversion image or a reduced conversion image obtained by reducing the conversion image as process target pixels,
selecting at least one of level-value-limited conversion images from the plurality of level-value-limited conversion images for which a level value range including level values of the process target pixels is set to perform an expansion process on the selected images, and
performing a synthesis process of using, as a synthesized result, a value that is computed from level values of smoothed results of pixels corresponding to positions of the process target pixels among the level-value-limited conversion images on which the expansion process is performed to generate a synthesis image.

17. The image processing method according to claim 16, wherein the synthesizing includes performing the expansion process and the synthesis process by using an interpolation operation.

18. The image processing method according to claim 17, wherein the synthesizing includes performing the expansion process and the synthesis process by using a three-dimensional interpolation operation.

19. A computer readable storage medium having stored therein an image processing program causing a computer to execute a process comprising:
performing a gradation conversion on an input image to generate a conversion image;
performing a smoothing process on the generated conversion image or a first generation image generated from the conversion image to generate a plurality of level-value-limited conversion images, the smoothing process smoothing pixels within different ranges of level values with a filter having a same filter size;
selecting at least one of the generated level-value-limited conversion images;
synthesizing the at least one of the level-value-limited conversion images to generate a synthesis image; and
performing a gradation conversion on the generated synthesis image to generate a smoothed image that is converted to have a same gradation as that of the input image.

* * * * *